(12) United States Patent
Fromherz et al.

(10) Patent No.: US 7,139,629 B2
(45) Date of Patent: Nov. 21, 2006

(54) PLANNING AND SCHEDULING FOR FAILURE RECOVERY SYSTEM AND METHOD

(75) Inventors: Markus P. J. Fromherz, Palo Alto, CA (US); Daniel G. Bobrow, Palo Alto, CA (US)

(73) Assignee: Palo Alto Research Center Incorporated, Palo Alto, CA (US)

(*) Notice: Subject to any disclaimer, the term of this patent is extended or adjusted under 35 U.S.C. 154(b) by 743 days.

(21) Appl. No.: 10/424,620

(22) Filed: Apr. 28, 2003

(65) Prior Publication Data

US 2004/0216002 A1    Oct. 28, 2004

(51) Int. Cl.
G06F 19/00    (2006.01)

(52) U.S. Cl. .............. 700/100; 700/108; 700/109; 700/110; 702/182; 702/184

(58) Field of Classification Search ............ 700/97, 700/99, 100, 101, 102, 103, 108, 109, 110, 700/111, 174, 175; 714/2, 25, 47; 702/182, 702/183, 184, 185

See application file for complete search history.

(56) References Cited

U.S. PATENT DOCUMENTS

| | | | |
|---|---|---|---|
| 5,095,342 A | 3/1992 | Farrell et al. ............ 355/319 |
| 5,159,395 A | 10/1992 | Farrell et al. ............ 355/319 |
| 5,557,367 A | 9/1996 | Yang et al. ............ 355/202 |
| 5,696,893 A | 12/1997 | Fromherz et al. ............ 395/112 |
| 5,826,104 A | 10/1998 | Rifkin ............ 395/835 |
| 6,115,646 A | 9/2000 | Fiszman et al. ............ 700/181 |
| 6,216,109 B1 | 4/2001 | Zweben et al. ............ 705/8 |
| 6,233,493 B1 | 5/2001 | Cherneff et al. ............ 700/95 |
| 6,438,436 B1* | 8/2002 | Hohkibara et al. ......... 700/100 |
| 6,785,586 B1* | 8/2004 | Toprac et al. ............ 700/100 |
| 6,978,187 B1* | 12/2005 | Ryskoski ............ 700/100 |
| 6,999,829 B1* | 2/2006 | Bazzocchi et al. ............ 700/99 |

FOREIGN PATENT DOCUMENTS

WO    WO 96/40558    12/1996

OTHER PUBLICATIONS

Muller, T., "Practical Investigation of Constraints with Graph Views", *Principles and Practice of Constraint Programming CP 2000, 6th International Conference*, vol. 1894, Sep. 2000, pp. 320-336.

Lever, J. et al., "Constraint Logic Programming for Scheduling and Planning", *BT Technology Journal, BT Laboratories*, vol. 12, No. 4, Oct. 1994, pp. 73-80.

European Search Report for EPO Counterpart Application No. 04009991.3 Sep. 28, 2004.

U.S. Appl. No. 10/284,560, titled "Planning and Scheduling Reconfigurable Systems with Regular and Diagnostic Jobs" to Markus P.J. Fromherz, filed Oct. 30, 2002.

* cited by examiner

*Primary Examiner*—Leo Picard
*Assistant Examiner*—Charles Kasenge
(74) *Attorney, Agent, or Firm*—Linda M. Robb

(57) ABSTRACT

A computer controlled system provides for configuration-specific recovery of operation in a reconfigurable production system having a plurality of modules with a plurality of alternative capabilities for processing work units. The system includes a system controller having planning, scheduling, and performance failure identification functions. The planning function plans utilization of selected module capabilities in the production of jobs having not less than one work unit and the scheduling function schedules utilization of selected module capabilities in the production of jobs. The failure identification function identifies the failure of module capabilities to perform the work units for a scheduled job.

19 Claims, 6 Drawing Sheets

PLANNING AND SCHEDULING FOR FAILURE RECOVERY SYSTEM AND METHOD

CROSS REFERENCE TO RELATED APPLICATIONS

The following copending applications, U.S. application Ser. No. 10/424,322, filed Apr. 28, 2003, titled "Monitoring and Reporting Incremental Job Status System and Method", U.S. Application Ser. No. 10/424,661, filed Apr. 28, 2003, titled "Predictive and Preemptive Planning and Scheduling for Different Job Priorities System and Method", are assigned to the same assignee of the present application. The entire disclosures of these copending applications are totally incorporated herein by reference in their entirety.

INCORPORATION BY REFERENCE

The following U.S. patent is fully incorporated herein by reference: U.S. Pat. No. 5,696,893 ("System for Generically Describing and Scheduling Operation of Modular Printing Machine").

BACKGROUND OF THE INVENTION

This invention relates generally to the control and management of automated manufacturing systems, and more particularly to a system and method for failure recovery and state transitioning of a reconfigurable production system.

Model-based planning and scheduling (the system control software) in production systems is often used only for creating schedules for normal behavior, but is not involved in recovering from failures in the execution of these schedules and in transitioning from inconsistent to consistent states of the system. In the case of traditional systems, typically the entire system is stopped when one of its modules goes off-line or declares a fault. Furthermore, if it is possible to recover from the fault without operator intervention, simple recovery procedures are invoked (e.g., to purge all work units currently in the process path and not yet delivered), and the system is then restarted to produce the uncompleted part of the current job. The reason for choosing simple default recovery procedures is that the general problem of fault recovery, which may require rerouting work units, redoing operations, and redoing selected parts of a job, is often as complex as the original planning and scheduling problem, in particular for a reconfigurable system.

This approach is unsatisfactory for systems with parallel modules or a potentially large number of work units in process. With different parts of a job distributed among multiple modules, simple procedures such as purging all work units in process lead to considerable waste in the best case and significant lost production time in the worst case. Due to the complexity of recovering in many-module systems, simple local recovery may actually lead to inconsistencies in the system state or at least to unexpected module interactions.

Instead, with these systems, it would be desirable to continue using all available system capabilities by planning and scheduling from the current system state, if sufficiently known, circumventing offline modules and redoing work only as necessary. In some cases, it would be useful if the software worked with the operator to help make decisions and execute some of the necessary operations.

SUMMARY OF THE INVENTION

Briefly stated, and in accordance with one aspect of the present invention, a computer controlled system provides for configuration-specific recovery of operation in a reconfigurable production system having a plurality of modules with a plurality of alternative capabilities for processing work units. The system includes a system controller having planning, scheduling, and performance failure identification functions. The planning function plans utilization of selected module capabilities in the production of jobs having not less than one work unit and the scheduling function schedules utilization of selected module capabilities in the production of jobs. The failure identification function identifies the failure of module capabilities to perform the work units for a scheduled job.

In accordance with another aspect of the invention, there is disclosed a method for configuration-specific recovery of operation in a reconfigurable computer controlled production system having a plurality of modules with a plurality of alternative capabilities for processing work units. The method includes planning and scheduling utilization of selected module capabilities in the production of jobs having not less than one work unit. Performance commands are provided to the modules within the manufacturing system and performance failure of any module capabilities in the production of a job is identified.

In accordance with yet another aspect of the invention, there is disclosed an article of manufacture in the form of a computer usable medium having computer readable program code embodied in the medium which, when the program code is executed by the computer causes the computer to perform method steps for configuration-specific recovery of operation in a reconfigurable computer controlled production system having a plurality of modules with a plurality of alternative capabilities for processing work units. The method includes planning and scheduling utilization of selected module capabilities in the production of jobs having not less than one work unit. Performance commands are provided to the modules within the manufacturing system and performance failure of any module capabilities in the production of a job is identified.

BRIEF DESCRIPTION OF THE DRAWINGS

The foregoing and other features of the instant invention will be apparent and easily understood from a further reading of the specification, claims and by reference to the accompanying drawings in which:

DETAILED DESCRIPTION OF THE INVENTION

Disclosed herein is a method and system that tracks and monitors the status of scheduled production functions within a system controller, in which the controller provides for continued use of all available system capabilities and reports system state and updated module models as necessary after each capability is executed. To accomplish this, the current schedule and the events reported by system modules are incrementally integrated in a coordinated manner as jobs are executed and a log of plan execution may be formed. These forms of information give the system control software the ability to better report system status to an operator, and they provide a basis for planning for failure recovery and state transitioning. For a system state provided in a detailed, constraint-based format, the system and method create a new plan and schedule to produce the unfinished job elements, using the capabilities of the system and the original job constraints. In contrast to existing approaches to scheduling, the system and method described herein explicitly consider purging and re-creation as one of the capabilities that could be executed to produce the jobs. The system and method also contemplates multiple mechanisms for purging job elements, including human intervention.

The system and method apply to control software used for multi-step production processes such as manufacturing, printing, or assembly and provide for the handling of complex operations over complex paths to provide flexible routing, optimal productivity, and optimal load balancing. In the following description numerous specific details are set forth in order to provide a thorough understanding of the present invention. It would be apparent, however, to one skilled in the art to practice the invention without such specific details. In other instances, specific implementation details have not been shown in detail in order not to unnecessarily obscure the present invention.

Figure 1:
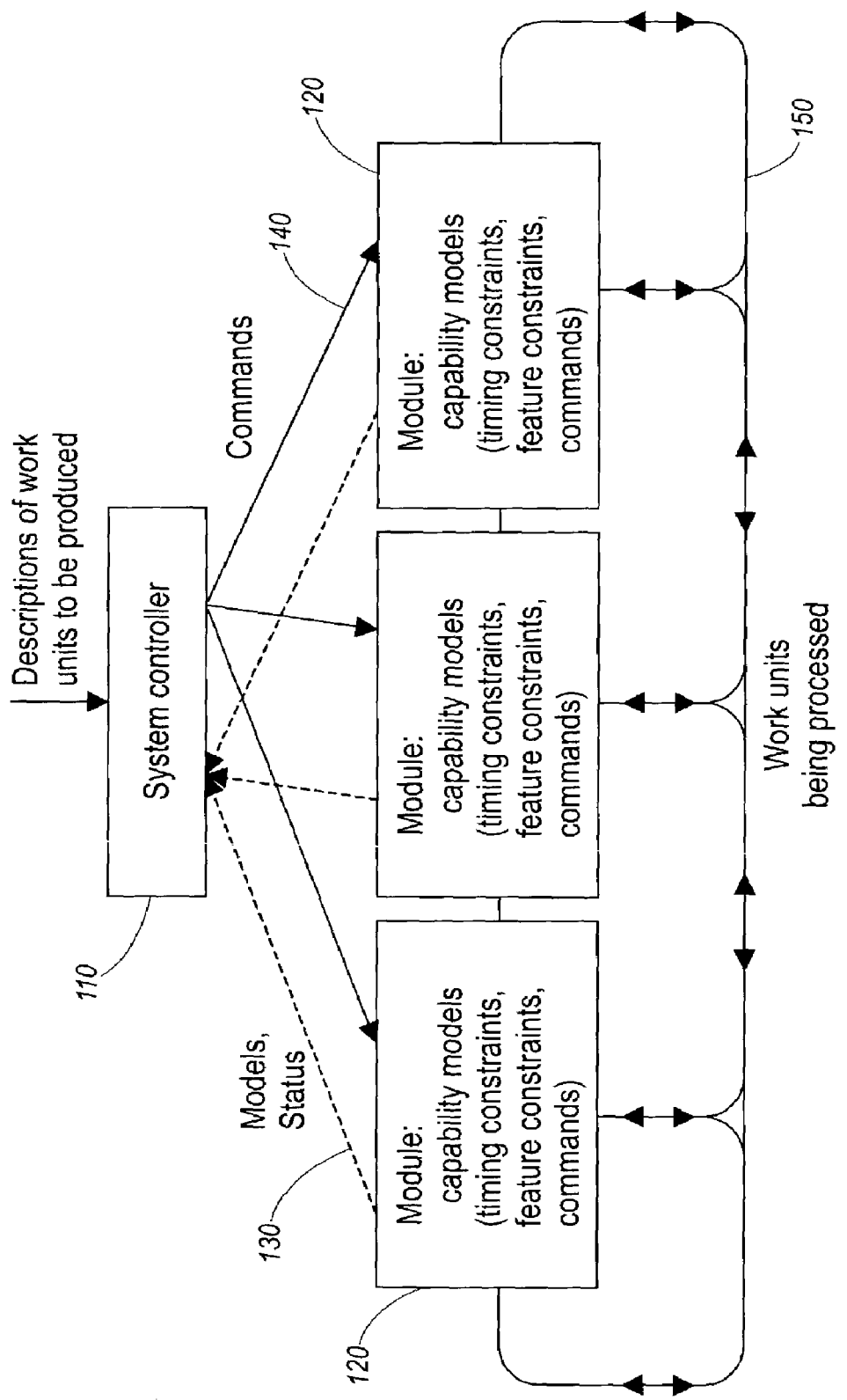
FIG. 1 illustrates a system for planning and scheduling for failure recovery in accordance with one embodiment of the subject invention.

Turning now to the drawings, wherein the purpose is for illustrating the embodiments of the system and method, and not for limiting the same, FIG. 1 illustrates a controller for planning and scheduling normal and fault recovery operations in conformance with one embodiment of the subject system. In a system 100, system controller 110 receives descriptions of work units to be produced from any known type of job input source. These descriptions correspond to descriptions of the desired output products or other goals to be achieved. They may specify attributes (or properties) of the products, values or ranges or general constraints for these attributes, and possibly constraints on the timing of the production (e.g., deadlines), but generally without specifying how the products are to be produced.

System controller 110 also receives, along paths 130, capability models and performance log information from each module 120 in the system. The capability models are descriptions of how the modules move and transform work units, generally together with information about the attributes and timing of the work units. Models may be sent to the system controller only once when the production system is started up, or the models may be updated regularly or when changes occur. Such changes in the modules (and therefore in the models) may, for example, be the reconfiguration of the modules, changes in timing values, and the unavailability of resources (and thus some capabilities). The capability models include, for example, timing constraints (e.g., the duration of execution of a capability, the time during which a resource is occupied, or the reservation of a resource), feature constraints (e.g., limits on the size of the work units being processed, transformation of the work units such as changing the orientation of a part or adding two parts together), and commands (e.g., the names or identifications of the operations corresponding to the capabilities, together with times and possibly other information). The timing and feature constraints describe when and how a capability can be applied to a work unit. The commands are the commands that are sent to the modules in order to start the corresponding operations.

Modules 120 may encompass many varying types of production systems, for example machine modules of a print engine, such as a feeder module, mark engine module, finisher module, or transport module. Alternatively, modules 120 may include the analysis modules of a biotech screening system, which may comprise a preparation module, heating module, mixing module, analysis module, or transport robot. Manufacturing line modules may include a machining module, assembling module, testing module, transport robot, or packaging module. A packaging line may include a bottle filling module or a labeling module. System controller 10 considers all possible system capabilities when searching for schedules for the desired work units.

Planning and scheduling some or all of the desired work units of one or more jobs results in a set of selected and scheduled capabilities. With these available, the system controller 110 sends the instruction commands corresponding to the scheduled capabilities to modules 120 along paths 140. Each of the modules then performs its task sequence for the completion of the specified job. As can be seen in path 150, which illustrates the path of the work units being processed, work may cycle repeatedly within a particular module 120 before moving to the next module in succession, or work may cycle repeatedly among several modules before passing to a third module. Although only three modules 120 are illustrated for the purposes herein, it will be understood that a system may include numerous modules, depending on the complexity of the job requirements. The modules may have various configurations within a system that is reconfigurable. Additionally there is also capability for operator feedback as to the work being scheduled on the modules and the state of the system at any point in time.

Figure 2:
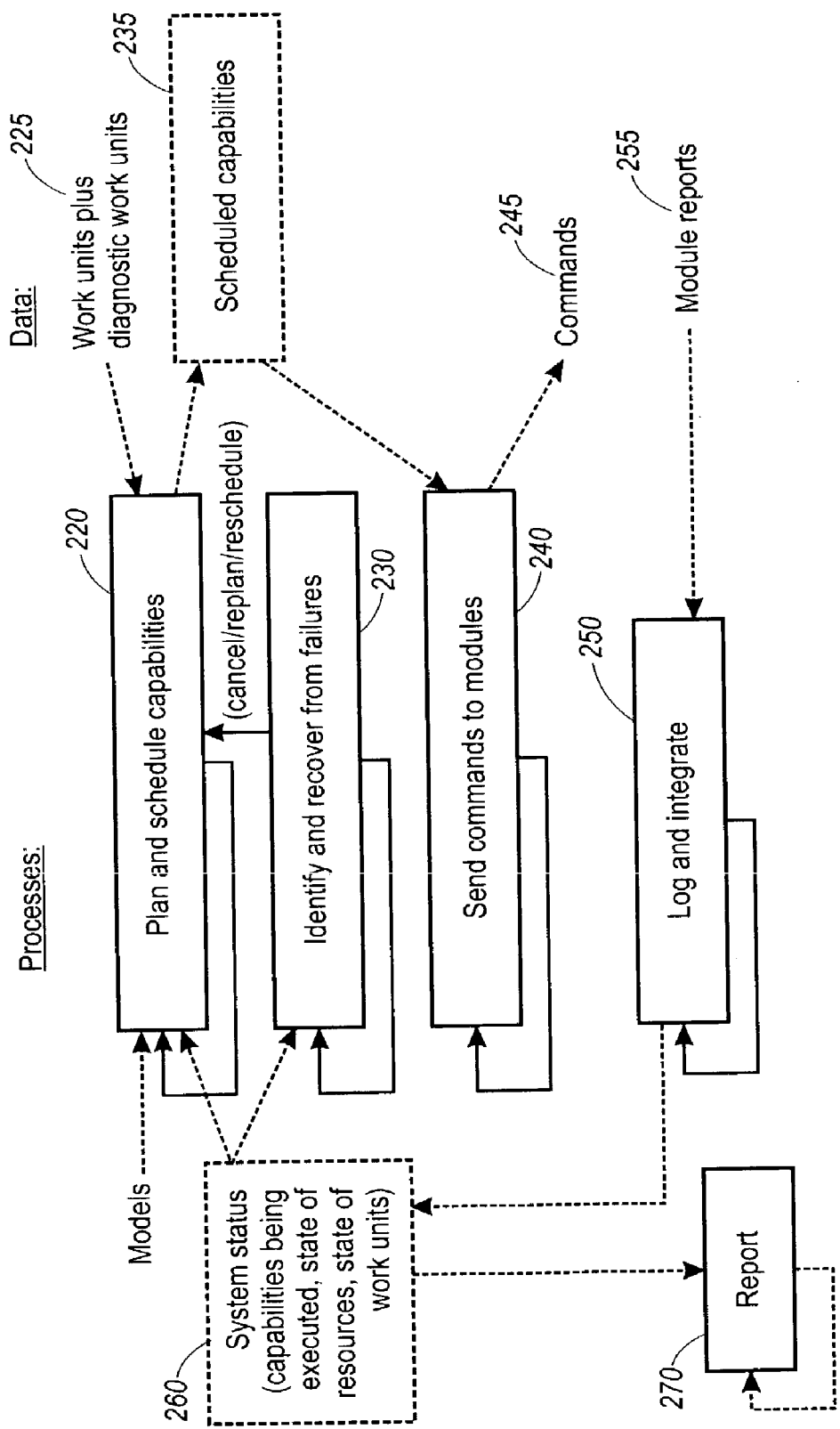
FIG. 2 provides a flow chart detailing the ordering of operations to accomplish planning and scheduling for failure recovery in accordance with one embodiment of the subject invention.

The system control software plans and schedules jobs by selecting capabilities, determining the timing variables of these capabilities, and identifying and recovering from failures to execute scheduled capabilities. FIG. 2 illustrates the planning, scheduling, monitoring, reporting, and an approach to identifying and recovering from failures by the system controller. In this diagram, method steps are described in terms of data received and provided to each subsequent step in the process. Each of the steps 220, 230, and 240 in this process may be executed in sequence (one after the other) or concurrently. In either case, each step consumes data 225, 235, or discrepancies between schedule and execution provided by a previous step or another action within the system, and produces data 235, 245, and ultimately 270 for subsequent steps or other system operations. Consuming and producing this data is generally done incrementally, where a step is processing one data item after another, but may also be done in batches, as will be obvious to one skilled in the art of real-time software. Initially, a description of the work units 225, or job to be performed, is provided to the controller. If diagnostic jobs have to be performed, corresponding work units are inserted concurrently into the job queue.

The controller also has the models of the system modules available together with the current state of the system and information as to discrepancies between schedule and execution 260, e.g., which operations are currently performed by the modules, and any capabilities it may have previously planned and scheduled. The selected work units plus any optional diagnostic work units 225 are then transmitted to step 220, which plans and schedules the capabilities for the selected work units, taking into consideration the capability model for each module. This step is repeated for each work unit and diagnostic work unit selected in the previous step, and a set of scheduled capabilities 235 is created. At 230, failures are identified and a recovery mode is identified based on schedule and execution discrepancy data from 260. Concretely, any (significant) discrepancy between schedule and execution points to a possible failure. (Failures may be either current faults that need intervention, or imminent faults that may still be avoided.) Thus, the software has to identify whether the reported execution will still satisfy the constraints given by jobs and models. For example, if a work unit stays longer in a module than expected, will it overlap (i.e., collide) with other scheduled work units? If a work unit is delayed, will it still satisfy the precedence constraints with respect to other work units? If a work unit transformation (e.g., change in orientation) wasn't executed, can that be compensated for? This reasoning can be done by modifying the schedule based on the module reports and then checking it against the constraints.

If the constraints continue to be satisfied, no further action should be necessary. (This also allows the modules some autonomy in resolving local issues, which further improves robustness.) By updating or attempting to update schedules according to the module reports, the scheduler's facility to generate correct schedules (e.g., constraint solver) can be used to detect if production is becoming inconsistent due to execution differences. For example, if operations on a work unit are delayed, work units of the same jobs may be produced out of order (and thus precedence constraints will be violated) or work units may collide (and thus resource constraints will be violated). By comparing and integrating such execution differences into its schedules, the scheduler can immediately detect such inconsistencies.

If the constraints are no longer satisfied, the detailed system state provides a basis for determining whether and how the system can recover from the failure. For example, a typical result of failure is that parts of a job will violate their precedence constraints (i.e., would come out in a different order than desired because of delays of some work units) or will not be produced at all (because modules that were scheduled to produce them went off-line). The state will help identify those parts, such that the system control software can recover, perhaps by re-planning or rerouting these jobs. System failure identification and failure recovery mode are provided to planning and scheduling step 220 for incorporation into the dynamic system schedule.

Scheduled capabilities 235 are in turn provided to step 240, at which the controller sends the commands 245 corresponding to the scheduled capabilities to the individual modules. This step is repeated for each scheduled capability. Modules incrementally report the execution of capabilities at the same level of detail as defined in their models. For example, a transport module may define a "move" capability with an input time, an output time, an input work unit (and its attributes), an output work unit (and its attributes), and some constraints between these (e.g., time constraints between the time variables, attribute transformations between the work unit variables, etc.); if the system control software selects and schedules that capability (determining values for the time and attribute variables), a command will be sent to the module to execute this capability at the given time, and the module will report back the actual values (or the differences to the expected values) for the model variables (times, attributes, resources). These module reports 255 are logged at 250 and integrated to build a detailed log of the execution of its schedules. The log may explicitly or implicitly include a history of the system's behavior. For example, instead of a single value for timing values, the log may maintain a distribution of values, including frequency or likelihood of occurrence. This information is then utilized to update the system status 260 and generate a system report 270.

Alternatively, modules may report their behavior only if it deviates (significantly) from the expected behavior, which reduces reporting overhead. Since modules have access to their own models, no special communication with the system controller is needed. In order to determine whether a module is about to fail, it is necessary to know the current observed behavior values and the limits on those values. However, closeness to a failure also depends on controllability, i.e., "within 5% of the limit" may be acceptable for a module with tight control but near-catastrophic for a module that has poor sensing capabilities.

In creating a new plan and schedule to produce unfinished job elements, the method uses the capabilities of the manufacturing system with its modules and the original job constraints. In contrast to existing approaches to scheduling, the method explicitly considers purging and re-creation as one of the options for job production. Additionally, both recovery and re-creation of in-process job elements have to be viewed in the context of other job elements that were already planned and scheduled. As an example, consider a job consisting of two elements. The production of element 2 may have been started first (e.g., because it takes longer to produce than element 1). The planner/scheduler has a schedule for both elements, but the system was only producing the second one when it encountered a fault. Consequently, the planner/scheduler has to schedule both together in order to guarantee correct production. In one scenario, it may be possible to delay or reroute production of element 2 sufficiently that element 1 can be produced in the meantime and delivered before 2. In another scenario, element 1 could no longer be moved ahead of 2 and therefore element 2 has to be purged, and both job elements have to be produced from scratch.

Figure 3:
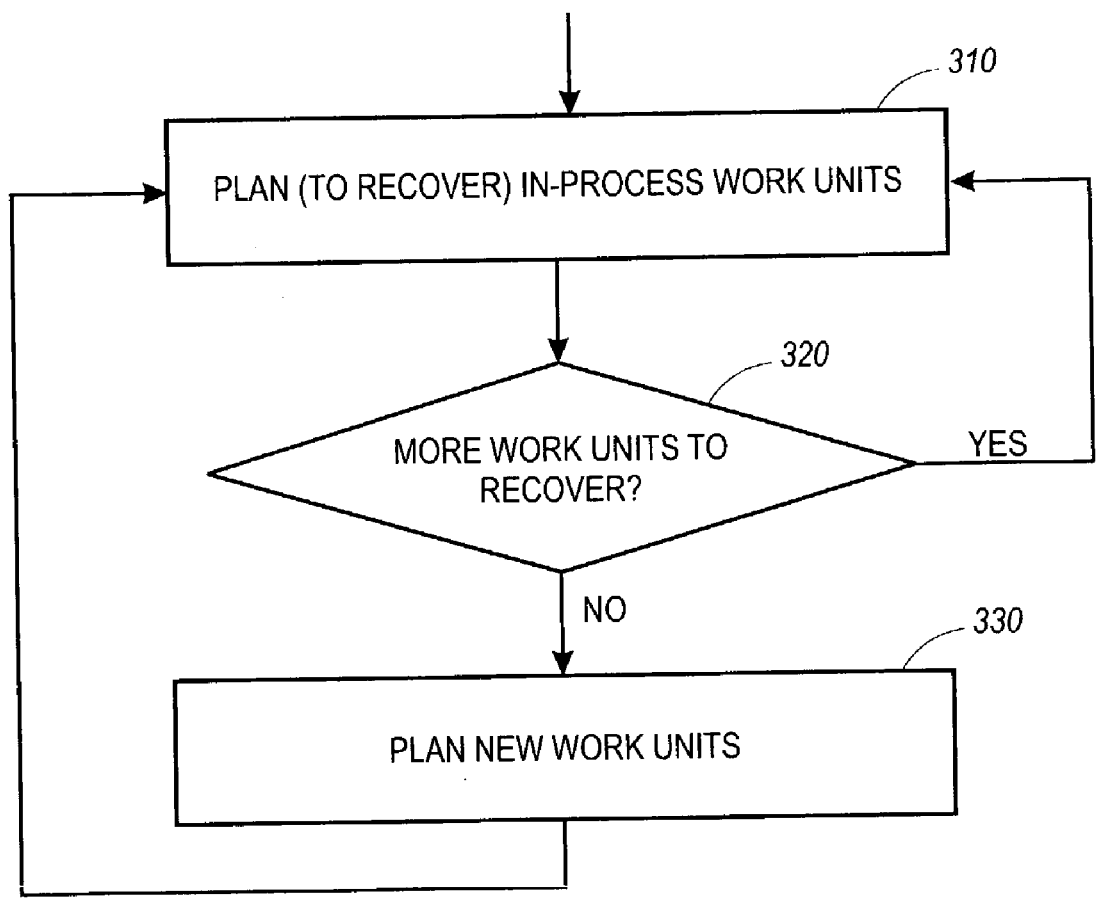
FIG. 3 provides a flow chart detailing the ordering of operations to accomplish planning for the recovery of work units and the planning of new work units in accordance with an embodiment of the subject invention.

Turning now to FIG. 3, a flow chart illustrates an example embodiment of operations utilized in planning for the recovery of work units and the planning of new work units according to the subject invention. As will be seen, there is an outer loop that plans and schedules recovery before planning and scheduling new work units. At 310, a plan is formulated to recover in-process work units for current or future production purposes. The method queries the system at 320 to identify whether additional work units are to be recovered. If additional work units are to be recovered, the plan is adjusted at 310 and the query is repeated until all recovery units have been identified. New work units are then planned at 330.

The primary advantages to the approach are the reduction of waste and production time in the face of faults. The method attempts recovery by restarting from the current state of the system if that is more efficient than restarting production from scratch. (Conversely, if purging and re-creating in-process work units is more efficient, that is preferred.) For complex, reconfigurable systems, the method tries to make use of the variety of available capabilities to optimize recovery. There is no need for a separate, heuristics-based recovery algorithm. The approach is configuration-independent and thus easily reused for arbitrary reconfigurable production systems that can be modeled in this framework.

Figure 4:
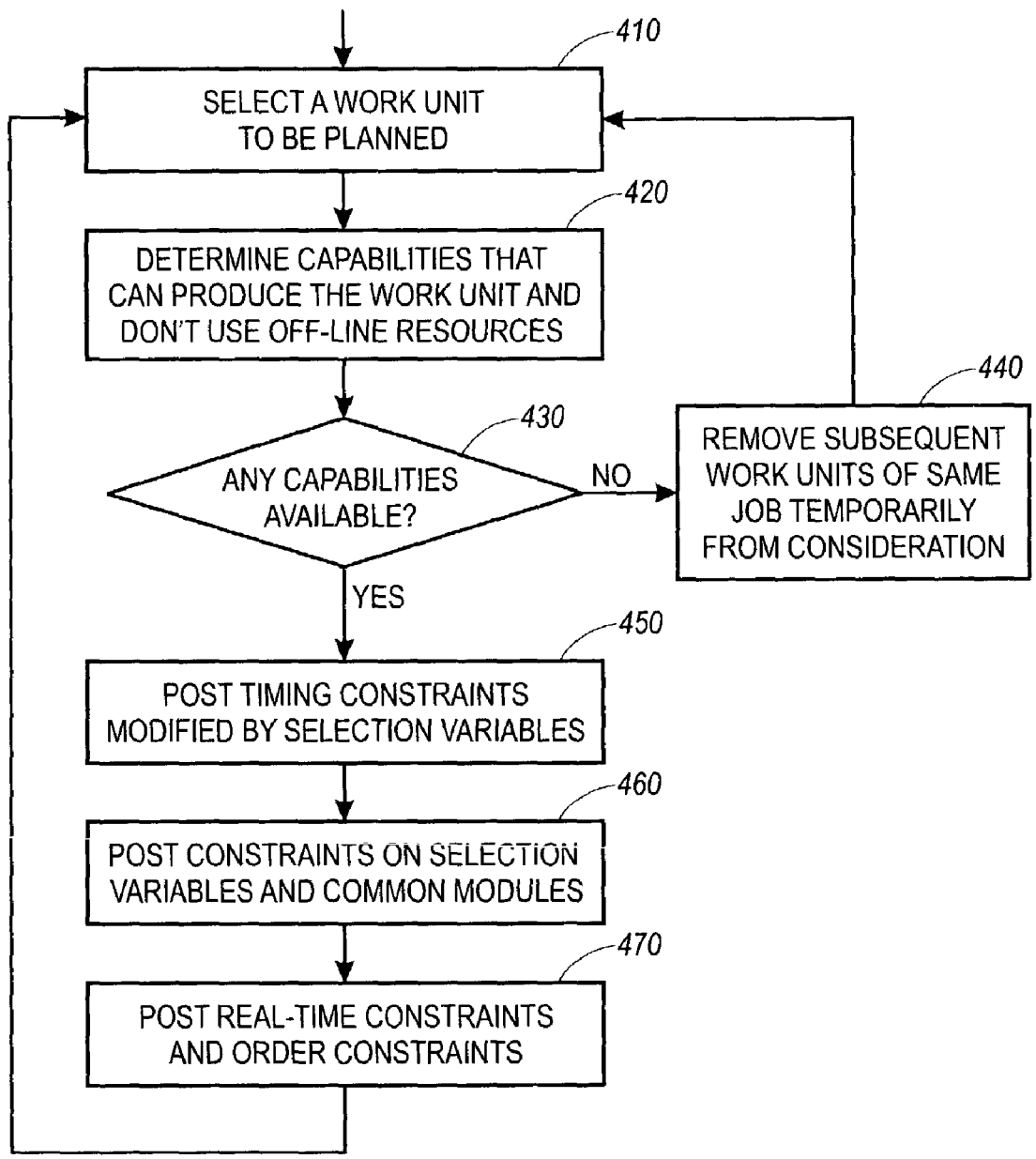
FIG. 4 provides a flow chart detailing the ordering of operations to accomplish planning regular or new work units in accordance with an embodiment of the subject invention.

An illustrative embodiment of the ordering of operations to accomplish planning regular or new work units is presented in FIG. 4. A work unit or job to be planned is selected at step 410 based on the input job description. The controller then determines the capabilities needed to produce the work unit without utilizing off-line resources at step 420. An off-line resource is any module or partial module that is currently unavailable, e.g., because it is powered down or broken. In making this determination at step 420, the controller considers all possible system capabilities, excluding the capabilities of the off-line resource(s), from which alternative capabilities are selected. The controller determines if capabilities are available to produce the work unit at step 430. If sufficient capabilities are not available, subsequent work units of the same job are temporarily removed from consideration at step 440 and the controller returns to step 410 to select another work unit to be planned. If no capability remains available for a desired work unit, all subsequent work units of the same job will be delayed, even if they could be produced, in order to avoid out-of-order output delivery.

If sufficient capabilities for producing the work unit are available, timing constraints, such as the amount of time required for each task within a job (e.g., the duration of a transport operation or a processing step), constraints on the intervals during which resources are occupied, and the reservation of resources during such intervals are modified by selection variables and posted to the controller at step 450. Selection variables are Boolean variables, one for each capability, that become either TRUE (the capability is selected) or FALSE (the capability is not selected). Selection variables are created automatically for each capability by the planning step.

Constraints on the selection variables determine that, for example, only one of several alternative capabilities for the same output can be selected (i.e., only its selection variables can be TRUE). The modification of constraints is constraint-type-dependent. Allocation intervals in resource allocations, for example, are multiplied by the selection variables. The effect of these constraint modifications is that some constraints, such as a resource allocation, become only effective if the corresponding capability is being selected. The controller then posts to memory constraints on selection variables and common modules to the constraint store at step 460. At step 470 real-time constraints and order constraints are posted to the controller.

Since the correct output time must be used in the precedence constraints between capabilities of succeeding work units, the output variables of all alternative capabilities are connected to a single time variable, which is then used in the precedence constraints. The job constraints reserve resources for a job and all possible exit ports of capabilities being considered for work units in the job. If only part of a job is being scheduled at this point, the selected resource is reserved for the open-ended future, and otherwise for the duration of the job. This also ensures that jobs will be delivered correctly even if parts of them have not yet been produced due to off-line resources. The sequence of steps presented is only one example embodiment for the method disclosed herein. It will be apparent to one skilled in the art that numerous alternate step sequences would produce a similar result.

The use of selection variables allows the scheduler to consider all possible, alternative plans concurrently and to select one by instantiating its selection variable. An alternative to this method is to use search to go over the alternative plans, one after another, keeping the one with the best schedule. In the first case, planning of all capabilities precedes scheduling (finding the time values). In the second case, planning and scheduling are interleaved. In either case, the end result is a single plan and schedule for each work unit.

Figure 5:
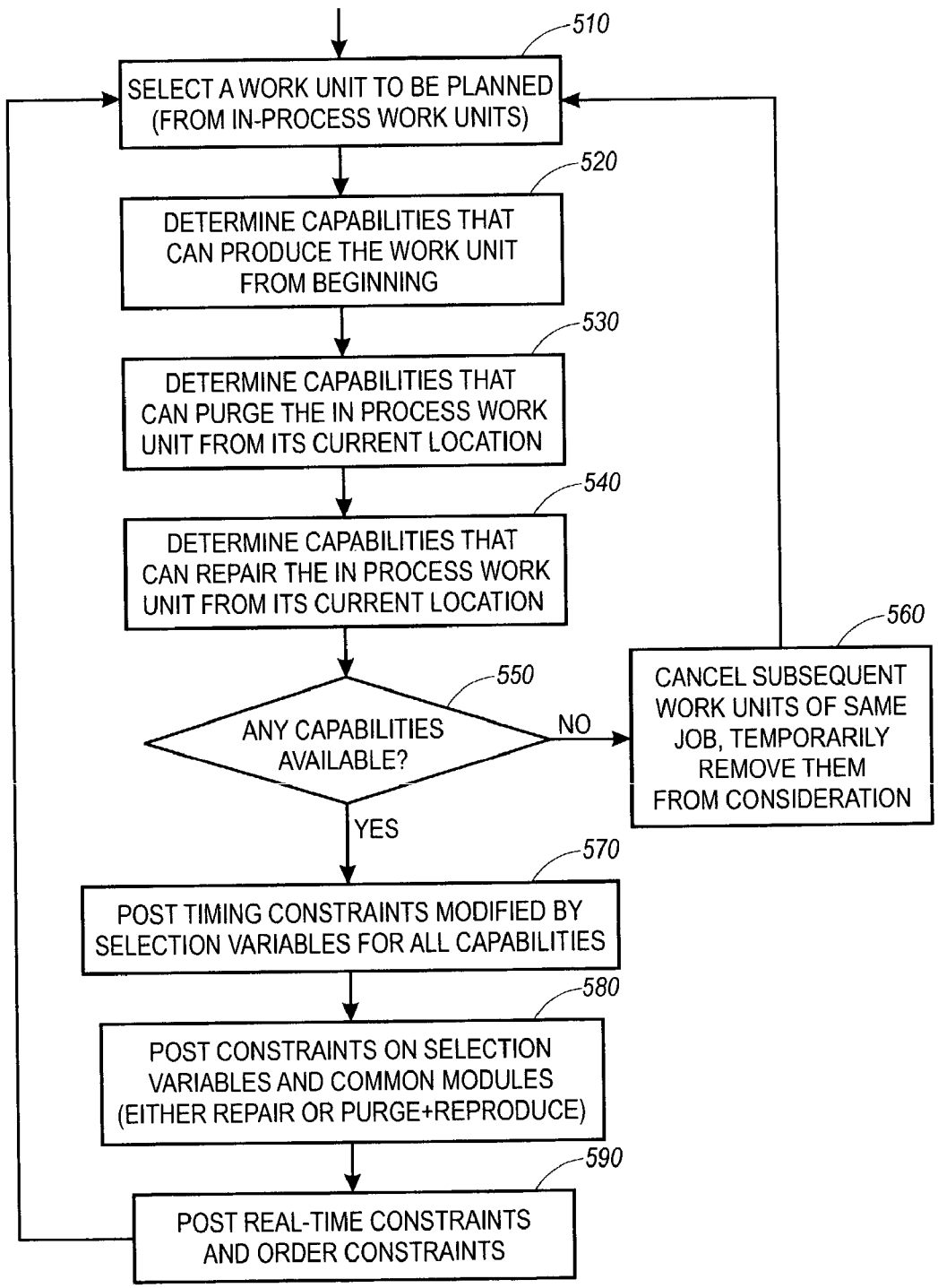
FIG. 5 provides a flow chart detailing the ordering of operations to accomplish planning for recovery of in-process work units in accordance with an embodiment of the subject invention.

FIG. 5 illustrates an example embodiment detailing the ordering of operations to accomplish planning for recovery of in-process work units. The controller selects a work unit to be planned from among the in-process work units at 510. The capabilities to produce the work unit from the beginning are identified at 520. For each in-process work unit, two sets of capabilities are considered during recovery: the capabilities producing the desired output product from the current location and state of the work unit ("recovery capabilities", subscript "r" in the example pseudo code hereinbelow); and capabilities purging and re-creating the desired output product ("purge capabilities" and "create capabilities", subscripts "p" and "c" hereinbelow). Recovery and purge capabilities start from the current location, while "create" capabilities are regular system capabilities producing the product from the beginning.

At 530, the controller determines the capabilities that can purge the in-process work unit from its current location. The definition of "current location" is implementation-specific. It may be assumed, for example, that the capability which was scheduled to be executed at the time of the fault can be completed. Consequently, recovery and purge capabilities can start from the exit port of the corresponding module. Alternatively, rather than considering purging and recreation immediately as one of the alternatives, the planner/scheduler could first attempt to create a regular schedule from the current state. If this fails, it would identify those parts that violate constraints (e.g., timing or precedence constraints) and first plan and schedule their purging. The controller would then plan and schedule the jobs again. This could also be done in multiple iterations.

The controller identifies capabilities that can repair the in-process work unit from its current location at 540 and determines whether sufficient capabilities are available at 550. If sufficient capabilities are not available, the controller cancels subsequent work units of the same job and temporarily removes them from consideration at 560. A new work unit is then selected at 510 and the identification of capabilities is repeated for the new work unit. Alternatively, if the current capability cannot be completed, either the entire module has to be declared as off-line (and re-creation is the only option), or the current capability has not been executed, but the work unit's state is known (and both recovery and re-creation are options), or the state of the work unit is unknown (i.e., the work unit has to be purged and recreation is again the only option).

If sufficient capabilities are available, the controller posts timing constraints modified by selection variables for all capabilities at 570. Constraints on selection variables and common modules is posted at 580 to enable the system to either repair the fault or purge the work unit and reproduce it. Constraints on the selection variables determine that, for example, only one of several alternative capabilities for the same output can be selected (i.e., only its selection variables can be TRUE). In step 580, the constraints are defined such that, for each work unit, either only a repair capability or a purge capability together with a reproduce (i.e., create) capability will be selected. The modification of constraints is constraint-type-dependent. Allocation intervals in resource allocations, for example, are multiplied by the selection variables. The effect of these constraint modifications is that some constraints, such as a resource allocation, become only effective if the corresponding capability is being selected. The controller posts real-time constraints and order constraints at 590 for use by the scheduler before it returns to 510 to select another work unit to be planned.

One example of pseudo code for planning for recovery of in-process work units presented herein posts the entire (disjunctive) problem to the constraint store and uses Boolean variables to select among capabilities in order to plan and schedule at the same time. As one skilled in the art would appreciate, other approaches could be utilized, for example, the different alternative capabilities could be posted one after the other, with the search procedure backtracking over the selection and posting of alternative capabilities as needed. Such alternate approaches are fully contemplated by the specification and scope of the claims herein.

```
initialize schedule S and constraint store C;
repeat forever do
    given the current schedule S, determine set U_p of in-process work units u and
        set U_f of all other (future) work units in S;
    for all work units u in U_p do
        determine set S_{u,c} of "create" capabilities s such that u = output work unit of s
            and exit port of s is in P_u
            and s does not use off-line resources;
        determine the exit port p_u of the module currently containing u;
        determine set S_{u,p} of "purge" capabilities s such that the entry port of s = p_u
            and exit port of s is a purge module
            and s does not use off-line resources;
        determine set S_{u,r} of "repair" capabilities s such that u = output work unit of s
            and exit port of s is in P_u
            and s does not use off-line resources;
        let S_u = union of S_{u,c}, S_{u,p}, and S_{u,r};
        add S_u to S;
        post to C: timing constraints of s_i in S_{u,c}, with selection variables b_i added;
        post to C: timing constraints of s_{i,p} in S_{u,p}, with selection variables b_{i,p} added;
        post to C: timing constraints of s_{i,r} in S_{u,r}, with selection variables b_{i,r} added;
        post to C: b_c = sum (s_i in S_{u,c}) b_i;
        post to C: b_p = sum (s_i in S_{u,p}) b_{i,p};
        post to C: b_r = sum (s_i in S_{u,r}) b_{i,r};
        post to C: b = b_p;
        post to C: 1 = b_p + b_r;
        post to C: real-time constraints for s_i in S_u;
        for all s_i in S_{u,c} and S_{u,r}, post to C: exit port of s_i = exit port of job of u; end
            for
        post to C: to = sum (s_i in S_{u,c} and S_{u,r}) b_i times output time of s_i;
        post to C: order constraint for t_o;
    end if
    end for
    for all work units u in U_f do
        (determine capabilities and post constraints as in regular scheduling;)
    end for
    for all jobs j and all possibly capabilities s_{i,j} in S_{u,c} and S_{u,r} scheduled above do
        r_{i,j} = resource for exit port of s_{i,j};
        if all work units in j are being scheduled then
            post to C: reserve r_{i,j} for the duration of job j;
        else
            post to C: reserve r_{i,j} for open-ended future for job j;
        end if
    end for
    solve for the undetermined time variables and selection variables in C;
    send commands to modules based on selected capabilities (b_i = 1) in S and
        determined time variables in C;
    clean up completed parts of S and C;
end repeat
```

Figure 6:
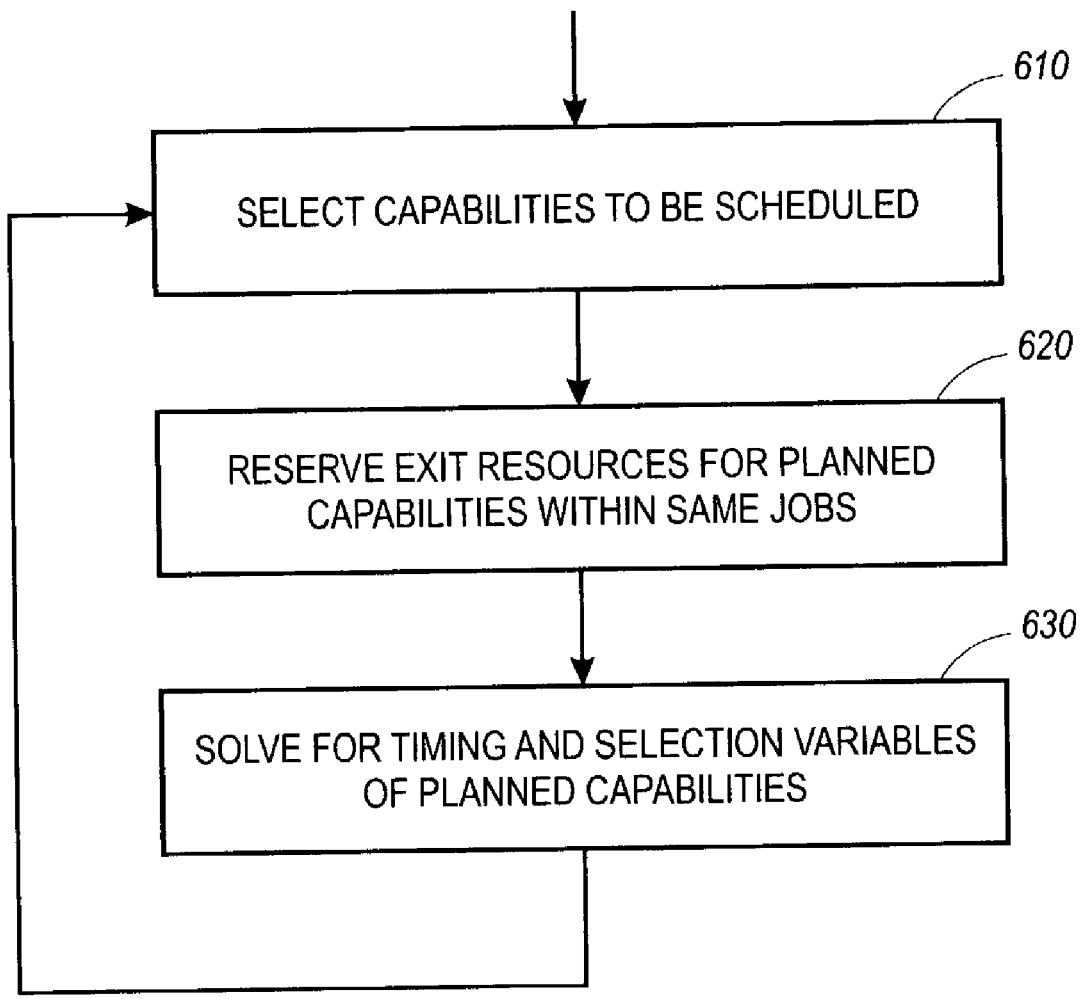
FIG. 6 provides a flow chart detailing the ordering of operations to accomplish scheduling in the presence of failure recovery in accordance with one embodiment of the subject invention.

Turning now to FIG. 6, a flow chart illustrates the scheduling function of the controller. Initially, in step 610, the controller selects those capabilities to be scheduled, which may be all or a subset of the capabilities provided by the planning step. The controller then reserves exit resources for planned capabilities within the same jobs at step 620. Since all work units of the same job are constrained to be delivered to the same final exit port, the resource connected to that same final exit port, corresponding for example to a finisher stack in a print engine, cannot be used by other jobs until the job is finished. At step 630 the controller then solves for timing and selection variables of planned capabilities. This can be accomplished using a number of constraint solving or constrained optimization techniques, which are known to those skilled in the art.

As an alternative to scheduling the recovery for all work units that were present in the previous schedule, the planner may identify all work units up to and including the ones currently in process (using the order required by the job description). This is the minimal set of work units to be included in the recovery. Additionally, the planner/scheduler may consider human capabilities in its plan. For example, if certain work units cannot be purged or cleared automatically, the planner may first be used to determine which job elements need to be handled by the operator and which it can process automatically. The operator may then be asked to decide how to handle those work units that cannot be purged or cleared automatically before the system proceeds.

Another alternative is to attempt local repair to the schedule to reflect the current system state. If repairs can be done without violating any constraints, execution can proceed from the repaired schedule. If schedule repair fails, the planner/scheduler could again identify those parts that violate constraints, plan and schedule their purging, and then restart regular scheduling. Schedule repair, e.g., changing the timings or actions in the schedule without creating an entirely new plan and schedule, can be accomplished using a number of constraint solving or constrained optimization techniques, which are known to those skilled in the art.

While the present invention has been illustrated and described with reference to specific embodiments, further modification and improvements will occur to those skilled in the art. For example, the recovery planner and scheduler is presented here as a separate procedure, which is used instead of the regular scheduler during the transition period of fault recovery, after which the software can switch to the regular scheduler again. Alternatively, the two methods could be integrated, i.e., fault recovery would be part of the regular scheduling method. Additionally, "code" as used herein, or "program" as used herein, is any plurality of binary values or any executable, interpreted or compiled code which can be used by a computer or execution device to perform a task. This code or program can be written in any one of several known computer languages. A "computer", as used herein, can mean any device which stores, processes, routes, manipulates, or performs like operation on data. It is to be understood, therefore, that this invention is not limited to the particular forms illustrated and that it is intended in the appended claims to embrace all alternatives, modifications, and variations which do not depart from the spirit and scope of this invention.

What is claimed is:

1. A computer controlled system for configuration-specific recovery of operation in a reconfigurable production system having a plurality of modules with a plurality of alternative capabilities for processing work units, the system comprising:
   a system controller;
   at least one planning function for planning utilization of selected module capabilities in the production of said jobs having not less than one work unit;
   at least one scheduling function for scheduling utilization of said selected module capabilities in the production of said jobs having not less than one work unit;
   at least one function for identifying performance failure of not less than one of said selected module capabilities in the production of said jobs having not less than one work unit; and
   at least one function for recovering from performance failure of not less than one of said selected module capabilities in the production of said jobs having not less than one work unit, wherein said function for recovering from performance failure comprises:
   means for determining capabilities for purging in-process work units affected by said performance failure from the current location of said in-process work unit;
   means for determining capabilities for repairing said in-process work units affected by said performance failure from the current location of said in-process work units;
   means for determining whether sufficient capabilities are available for completion of said jobs containing work units affected by said performance failure; and
   means for removing jobs containing work units affected by said performance failure from the queue of jobs to be performed.

2. The system for configuration-specific recovery of operation in a reconfigurable production system according to claim 1, wherein said function for identifying performance failure of not less than one of said selected module capabilities comprises:
   means for identifying not less than one module having a performance failure of said selected module capabilities; and
   means for designating said module having a performance failure as an off-line resource.

3. The system for configuration-specific recovery of operation in a reconfigurable production system according to claim 2, further comprising means for identifying subsequent work units forming a part of said not less than one job wherein said performance failure has occurred.

4. The system for configuration-specific recovery of operation in a reconfigurable production system according to claim 1, wherein said at least one scheduling function comprises means for structuring schedules with a plurality of information representations.

5. The system for configuration-specific recovery of operation in a reconfigurable production system according to claim 4, wherein at least one of said plurality of information representations comprises work units contained within the automated manufacturing system.

6. The system for configuration-specific recovery of operation in a reconfigurable production system according to claim 4, wherein at least one of said plurality of information representations comprises modules contained within the automated manufacturing system.

7. The system for configuration-specific recovery of operation in a reconfigurable production system according to claim 4, further comprising at least one module for cross-linking said plurality of information representations.

8. The system for configuration-specific recovery of operation in a reconfigurable production system according to claim 1, wherein said planning function further comprises:
   at least one function for determining module capabilities available in the reconfigurable production system;
   at least one function for posting timing constraints modified by selection variables;
   at least one function for posting constraints on selection variables and common modules; and
   at least one function for posting real-time constraints and order constraints.

9. A method for configuration-specific recovery of operation in a reconfigurable computer controlled production system having a plurality of modules with a plurality of alternative capabilities for processing work units, the method comprising:
   planning utilization of selected module capabilities in the production of jobs having not less than one work unit;

scheduling utilization of said selected module capabilities in the production of said jobs having not less than one work unit;

providing performance commands to the plurality of modules within said at least one manufacturing system;

identifying performance failure of not less than one of said selected module capabilities in the production of said jobs having not less than one work unit; and recovering from performance failure of not less than one of said selected module capabilities in the production of said jobs having not less than one work unit, wherein recovering from performance failure comprises:

determining capabilities for purging in-process work units affected by said performance failure from the current location of said in-process work unit;

determining capabilities for repairing said in-process work units affected by said performance failure from the current location of said in-process work units;

determining whether sufficient capabilities are available for completion of said jobs containing work units affected by said performance failure; and removing jobs containing work units affected by said performance failure from the queue of jobs to be performed.

10. The method for configuration-specific recovery of operation in a reconfigurable computer controlled production system having a plurality of modules according to claim 9, wherein scheduling the utilization of module capabilities in the production of jobs comprises scheduling capabilities according to a plurality of capability representations.

11. The method for configuration-specific recovery of operation in a reconfigurable computer controlled production system having a plurality of modules according to claim 10, wherein not less than one of said capability representations comprises work units included within said at least one production system.

12. The method for configuration-specific recovery of operation in a reconfigurable computer controlled production system having a plurality of modules according to claim 10, wherein not less than one of said capability representations comprises modules included within said at least one production system.

13. The method for configuration-specific recovery of operation in a reconfigurable computer controlled production system having a plurality of modules according to claim 10, further comprising cross-linking said plurality of information representations.

14. The method for configuration-specific recovery of operation in a reconfigurable computer controlled production system having a plurality of modules according to claim 9, wherein identifying performance failure of not less than one of said selected module capabilities comprises;

identifying not less than one module having a performance failure of said selected module capabilities; and designating said module having a performance failure as an off-line resource.

15. The method for configuration-specific recovery of operation in a reconfigurable computer controlled production system having a plurality of modules according to claim 14, further comprising identifying subsequent work units forming a part of said not less than one job wherein said performance failure has occurred.

16. The method for configuration-specific recovery of operation in a reconfigurable computer controlled production system having a plurality of modules according to claim 14, further comprising identifying all prior and current in-process work units forming a part of said not less than one job wherein said performance failure has occurred.

17. The method for configuration-specific recovery of operation in a reconfigurable computer controlled production system having a plurality of modules according to claim 9, further comprising requesting instructions from the operator for the handling of work units affected by said performance failure which cannot be purged from the production system.

18. The method for configuration-specific recovery of operation in a reconfigurable computer controlled production system having a plurality of modules according to claim 9, wherein recovering from performance failure of not less than one of said selected module capabilities in the production of said jobs having not less than one work unit comprises attempting to create a revised performance schedule utilizing available module capabilities.

19. An article of manufacture comprising a computer usable medium having computer readable program code embodied in said medium which, when said program code is executed by said computer causes said computer to perform method steps for configuration-specific recovery of operation in a reconfigurable computer controlled production system having a plurality of modules with a plurality of alternative capabilities for processing work units, the method comprising:

planning utilization of selected module capabilities in the production of jobs having not less than one work unit;

scheduling utilization of said selected module capabilities in the production of said jobs having not less than one work unit;

providing performance commands to the plurality of modules within said at least one manufacturing system;

identifying performance failure of not less than one of said selected module capabilities in the production of said jobs having not less than one work unit; and recovering from performance failure of not less than one of said selected module capabilities in the production of said jobs having not less than one work unit, wherein recovering from performance failure comprises:

determining capabilities for purging in-process work units affected by said performance failure from the current location of said in-process work unit;

determining capabilities for repairing said in-process work units affected by said performance failure from the current location of said in-process work units;

determining whether sufficient capabilities are available for completion of said jobs containing work units affected by said performance failure; and removing jobs containing work units affected by said performance failure from the queue of jobs to be performed.

* * * * *